(12) United States Patent
Hayashi et al.

(10) Patent No.: US 7,820,234 B2
(45) Date of Patent: Oct. 26, 2010

(54) MANUFACTURING METHOD OF OPTICAL INFORMATION RECORDING MEDIUM

(75) Inventors: Kazuhiro Hayashi, Kadoma (JP); Kazuya Hisada, Osaka (JP); Shinya Abe, Kadoma (JP); Kazuhiro Higashimaru, Kadoma (JP); Eiji Ohno, Hirakata (JP)

(73) Assignee: Panasonic Corporation, Osaka (JP)

( * ) Notice: Subject to any disclaimer, the term of this patent is extended or adjusted under 35 U.S.C. 154(b) by 1822 days.

(21) Appl. No.: 10/479,505

(22) PCT Filed: May 31, 2002

(86) PCT No.: PCT/JP02/05325
§ 371 (c)(1),
(2), (4) Date: May 10, 2004

(87) PCT Pub. No.: WO02/101736
PCT Pub. Date: Dec. 19, 2002

(65) Prior Publication Data
US 2004/0232570 A1 Nov. 25, 2004

(30) Foreign Application Priority Data
Jun. 7, 2001 (JP) .............................. 2001-172778

(51) Int. Cl.
*B05D 5/06* (2006.01)
*B05D 3/06* (2006.01)
*B05D 3/12* (2006.01)

(52) U.S. Cl. ....................... 427/162; 427/508; 427/240; 427/407.1

(58) Field of Classification Search ................. 427/162, 427/508, 164, 240, 407.1
See application file for complete search history.

(56) References Cited

U.S. PATENT DOCUMENTS

| | | | |
|---|---|---|---|
| 4,957,776 A | 9/1990 | Higuchi et al. | |
| 5,980,985 A | 11/1999 | Kikuchi | |
| 6,063,468 A * | 5/2000 | Aratani et al. | ............. 428/64.1 |
| 6,077,349 A | 6/2000 | Kikuchi | |
| 6,410,116 B1 | 6/2002 | Hirata | |
| 6,636,476 B1 | 10/2003 | Arakawa et al. | |
| 6,869,655 B1 | 3/2005 | Ono et al. | |
| 2002/0172139 A1 * | 11/2002 | Kondo et al. | ............. 369/275.4 |

FOREIGN PATENT DOCUMENTS

| | | | |
|---|---|---|---|
| EP | 1 043 718 | | 10/2000 |
| JP | 1-182944 | | 7/1989 |
| JP | 2-203439 | | 8/1990 |
| JP | 02-203439 A | * | 8/1990 |
| JP | 3-19150 | | 1/1991 |
| JP | 9-180254 | | 7/1997 |
| JP | 10-74341 | | 3/1998 |
| JP | 10-74342 | | 3/1998 |
| JP | 10-249264 | | 9/1998 |
| JP | 10-289489 | | 10/1998 |
| JP | 10-302309 | | 11/1998 |
| JP | 10-302309 A | * | 11/1998 |
| JP | 11-66647 | | 3/1999 |
| JP | 11-73691 | | 3/1999 |
| JP | 11-191240 | | 7/1999 |
| JP | 11-191240 A | * | 7/1999 |
| JP | 11-203726 | | 7/1999 |
| JP | 11-242829 | | 9/1999 |
| JP | 3104092 | | 9/2000 |
| JP | 2000-293894 | | 10/2000 |
| JP | 2000-339761 | | 12/2000 |
| JP | 2001-160241 | | 6/2001 |

* cited by examiner

*Primary Examiner*—William Phillip Fletcher, III
(74) *Attorney, Agent, or Firm*—Wenderoth, Lind & Ponack, L.L.P.

(57) ABSTRACT

A method of manufacturing an optical information recording medium to/from which signals can optically be recorded and reproduced. The recording medium includes a signal substrate (100), a signal recording layer (110), and a transparent cover layer (125) having a first transparent layer (115) and a second transparent layer (120), which is harder than the first transparent layer (115). Signals can be recorded and reproduced to and from the recording medium by a light transmitted to the signal recording layer through the transparent cover layer (125). The first transparent layer is formed so as to have a first predetermined distribution of thickness. The second transparent layer is formed so as to have a second predetermined distribution of thickness to make the total thickness of the transparent cover layer (125) uniform. The first transparent layer (115) may be made of a plurality of thin laminated transparent layers.

19 Claims, 10 Drawing Sheets

A-A' CROSS SECTION

Fig. 11B

B-B' CROSS SECTION

MANUFACTURING METHOD OF OPTICAL INFORMATION RECORDING MEDIUM

BACKGROUND OF THE INVENTION

1. Technical Field

The invention relates to a method of manufacturing an optical information recording medium that includes a signal substrate, a signal recording layer formed on one of its principal surfaces and a transparent cover layer (for example, with a thickness of about 0.1 mm) formed on the signal recording layer, in which a focused light is transmitted through the cover layer in the process of signal recording and reproducing.

2. Description of the Related Art

Optical information recording media are known for their high-density recording and reproducing performance through a laser beam, and their use has become widespread. In recent years, for recording video information such as movies as well as sound information, digital versatile discs (DVDs) as large-capacity optical discs have been developed for market and have already become widespread. The high-density optical disc such as a DVD is used with a short wavelength laser beam and a large numerical aperture (NA) objective lens. However, such a short wavelength and a large NA reduce the tolerance of warpage (tilt) of the disc. A thinner substrate is effective at increasing the tolerance of tilt, and for example, the DVD substrate has a thickness of 0.6 mm for use with a laser beam with a wavelength of 650 nm and with an NA of 0.60. However, a single 0.6 mm thick resin substrate has low mechanical strength and tends to tilt. Therefore, two substrates are bonded to form the DVD with the information recording surface placed inside. Using the bonded structure of two substrates, commercialized is a one-sided reproducing two-layer DVD in which both of the information recording surfaces are read from the one substrate side which includes a translucent reflection layer. Such a DVD has one substrate having a translucent reflection layer of gold, silicon, or the like formed on its information recording surface, and the other substrate has a general reflection layer of aluminum or the like formed on its information recording surface, and the recording surfaces are placed inside. A similar two-layer structure is also proposed as a rewritable DVD in which the information recording layer surface has a rewritable thin film in place of the metal reflection layer.

The use of a blue violet laser beam source (with a wavelength of around 400 nm) is also proposed for higher density. In such a case, for example, the transparent cover layer on the recording/reproducing side has a thickness of about 0.1 mm, and a lens with a NA of about 0.85 is used to form a hyperfine laser spot in recording or reproducing signals. For example, the transparent cover layer is formed by one of the following two methods:

(A) a transparent substrate with a thickness of slightly less than 0.1 mm is bonded with an adhesive to the signal recording layer side of a 1.1 mm thick signal substrate; and (B) a signal recording layer side of a 1.1 mm thick signal substrate is coated with a transparent resin layer with a thickness of about 0.1 mm.

In the first method (A), a 0.1 mm thick transparent cover layer can easily be formed by attaching the transparent substrate with a thickness of slightly less than 0.1 mm. However, such a transparent substrate with a thickness of slightly less than 0.1 mm is required to be extremely uniform in thickness and therefore expensive. In contrast, the second method (B) uses a transparent resin such as a resin for CD protection and a resin for DVD bonding and therefore can be performed at low cost.

SUMMARY OF THE INVENTION

In the case that the blue violet laser beam source (with a wavelength of around 400 nm) is used, NA is as large as about 0.85 so that the concentration is high, in contrast to the case of the general DVD. In such a case, the laser beam is very sensitive to the thickness of the transparent cover layer. In addition, the distance between the lens and the disc (working distance) is so small that the disc out of focus can collide with the lens due to a change in disc warpage and defects such as scratches and dust on the disc surface. In such a case, the surface of the transparent cover layer on the record/reproduction side can be damaged by a collision with the lens. Such damage to the surface of the transparent cover layer can result in local unevenness in the thickness of the transparent cover layer and degrade the recording and reproducing characteristics. In order to prevent the damage, a protective layer may further be formed on the transparent cover layer. However, such a protective layer can increase unevenness in the thickness of the transparent cover layer.

The second method (B) provides an asymmetric structure in which the transparent resin cover layer with a thickness of about 0.1 mm is formed on only one side of the signal substrate, resulting in increased warpage. When an adhesive of an ultraviolet cure type resin is used for the transparent resin layer, the resin layer can generally warp toward the signal recording layer side of the signal substrate by cure and shrink.

The invention has been made in light of the above problems. It is therefore an object of the invention to provide a manufacturing method of an optical information recording medium having an even protective layer that can be free from the influence of the lens collision or the like.

In a first aspect of the invention, provided is a method of manufacturing an optical information recording medium to/from which signals can optically be recorded and reproduced. The recording medium includes a signal substrate, a signal recording layer on one principal surface of the signal substrate, and a transparent cover layer. The transparent cover layer includes a first transparent layer formed on the signal recording layer and a second transparent layer that is formed on the first transparent layer and is harder than the first transparent layer. Signals are recorded and reproduced to and from the recording medium by a light transmitted to the signal recording layer through the transparent cover layer. In the method, the first transparent layer is formed so that the first transparent layer has a first predetermined distribution of thickness. The second transparent layer is formed so that the second transparent layer has a second predetermined distribution of thickness to make the total thickness of the transparent cover layer uniform. In the manufactured optical information recording medium, the record/reproduction side surface is formed of the harder second transparent layer, and is therefore tough enough with regard to the collision with the lens, so that the transparent cover layer can be kept uniform.

In a second aspect of the invention, provided is method of manufacturing an optical information recording medium to/from which signals can optically be recorded and reproduced. The recording medium includes a signal substrate, a signal recording layer on one principal surface of the signal substrate, and a transparent cover layer. The transparent cover layer includes a first transparent layer formed on the signal recording layer and a second transparent layer that is formed on the first transparent layer and is harder than the first transparent layer. Signals are recorded and reproduced to and from the recording medium by a light transmitted to the signal recording layer through the transparent cover layer. The method includes forming the first transparent layer by stacking a plurality of transparent layers so that the first transparent layer has a first predetermined distribution of thickness over the whole of the first transparent layer; and forming the second transparent layer so that the second transparent layer has a second predetermined distribution of thickness to make the total thickness of the transparent cover layer uniform. In this method, the first transparent layer can easily be formed with a high degree of precision and a large thickness by the step of stacking a plurality of thin transparent layers.

In any of the above methods, the first transparent layer may be made of a radiation cure type first resin having a viscosity of V1 before curing, the second transparent layer may be made of a radiation cure type first resin having a viscosity of V2 before curing which is lower than the viscosity V1, and the second resin after curing by radiation may be harder than the first resin after being cured by radiation. In this case, the first transparent layer may be formed so as to have a distribution of thickness such that the thickness decreases in a direction from the inner radius to the outer radius of the signal substrate, and then is cured, while the second transparent layer may be formed so as to have a distribution of thickness such that the thickness increases in the direction from the inner radius to the outer radius of the signal substrate.

According to the above method, even when the radiation cure type second resin used is a radiation cure type hard coat agent that has a low viscosity and becomes hard after being cured, the transparent cover layer can be uniform. In spin coating, the applied material with a low viscosity has a high tendency to thicken in the direction from the inner radius to the outer radius. On the other hand, the material with a high viscosity can easily be controlled with respect to the tendency in the thickness distribution in the radius direction. Therefore, the thickness distribution in the second transparent layer made from the radiation cure type second resin with a low viscosity can be cancelled by spin-coating the radiation cure type first resin in such a manner that its thickness decreases in the direction from the inner radius to the outer radius, so that the transparent cover layer can have a uniform total thickness.

In the above process, the first transparent layer may be formed by spin coating. In that case, the method may include controlling, depending on a time, the amount of the radiation cure type first resin supplied onto the inner part of a principal surface on the signal recording layer side of the signal substrate, the period of the supplying, and the revolution speed of the signal substrate. In this method, the first transparent layer is formed by spin coating, and thus unevenness in thickness of the transparent cover layer can easily be reduced over the circumference.

In the above process, the first transparent layer may be formed by spin coating. In that case, the radiation cure type first resin may be supplied onto the inner part of a principal surface on the signal recording layer side of the signal substrate. The signal substrate may be spun at a first revolution speed to apply the radiation cure type first resin over the whole of the principal surface, then the radiation cure type first resin may be supplied again onto the inner part of the principal surface, and the signal substrate may be spun at a second revolution speed, which is less than the first revolution speed, until the whole of the first transparent layer has the first distribution of thickness. This method can provide a desired distribution of thickness for the first transparent layer.

In the above process, the first transparent layer may be formed with a screen that has a plurality of holes to form the first transparent layer having the thickness distribution. Each hole is substantially concentrically distributed in the screen and has a diameter gradually decreasing in the direction from the inner radius to the outer radius. In this method, the supply amount of the resin is determined by the holes of the screen, and therefore, the first transparent layer can stably have a desired distribution of thickness.

In the above process, variations in thickness of the transparent cover layer are preferably within ±3 µm. In such a range, even a large NA lens can be free from trouble in recording and reproduction, and signals of good quality can be obtained.

In the above process, a warpage control layer may be formed on a principal surface on the opposite side of the principal surface where the transparent cover layer is formed. The warpage control layer can reduce warpage of the optical information recording medium.

When the material for the transparent cover layer is the radiation cure type resin, a warpage control layer may be formed on a principal surface on the opposite side of a principal surface which is formed with the transparent cover layer. In this case, the thickness of the warpage control layer and the shrinkage percentage of the material for the warpage control layer are preferably so selected as to provide the optical information recording medium with a warpage angle of 0.35 degrees or less. Under such conditions, the warpage angle can be controlled to 0.35 degrees or less by selecting the type of the warpage control layer and the formed thickness, even when the optical information recording medium formed with the transparent cover layer warps toward the transparent cover layer side. At a warpage angle of 0.35 degrees or less, good recording and reproducing characteristics can be obtained, even when the recording/reproducing apparatus has no warpage control function.

In the layer forming process, the material for the warpage control layer may have a cure shrinkage percentage that is higher than that of the radiation cure type resin for the transparent cover layer, and the warpage control layer may have a thickness that is smaller than that of the transparent cover layer. Such a material with a high shrinkage percentage for a thin warpage control layer can efficiently control warpage to a small amount, and therefore, the process can be performed at low cost.

The warpage control layer and the transparent cover layer may be made of the same material. In such a structure, the shrinkage quantity can easily be set at the same level on both sides of the optical information recording medium. In addition, such a structure can be near-symmetrical, so that not only warpage of the optical information recording medium but also a change in warpage in an accelerated test can be reduced.

In addition, the warpage control layer and the transparent cover layer may have substantially the same thickness. Under such conditions, the optical information recording medium can have a completely symmetrical structure, so that warpage can be very small and a change in warpage in an accelerated test can also be very small.

The warpage control layer may be formed by printing. In such a case, the warpage control layer can uniformly be formed by a short time process, and therefore, an improvement in productivity can be expected.

The warpage control layer may be formed on the opposite side principal surface so as to have visible patterns or letters. Alternatively, visible patterns or letters may be printed on the surface of the warpage control layer. According to such a technique, control of warpage and marking of information such as recorded contents and manufacturers can be performed at the same time on the optical information recording medium, so that the manufacturing process can be simplified.

DETAILED DESCRIPTION OF THE INVENTION

Referring to the drawings, embodiments of the present invention are described in detail below.

First Embodiment

Figure 1A:
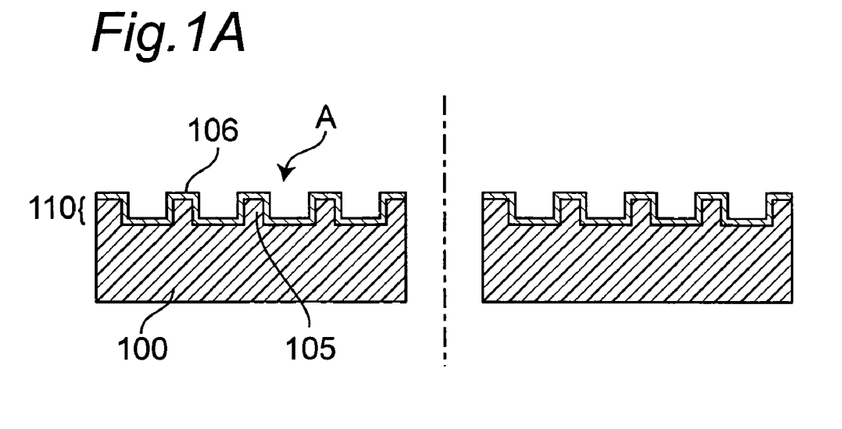
FIGS. 1A to 1C are schematic drawings showing a method of manufacturing the optical information recording medium according to the invention.
Figure 1B:
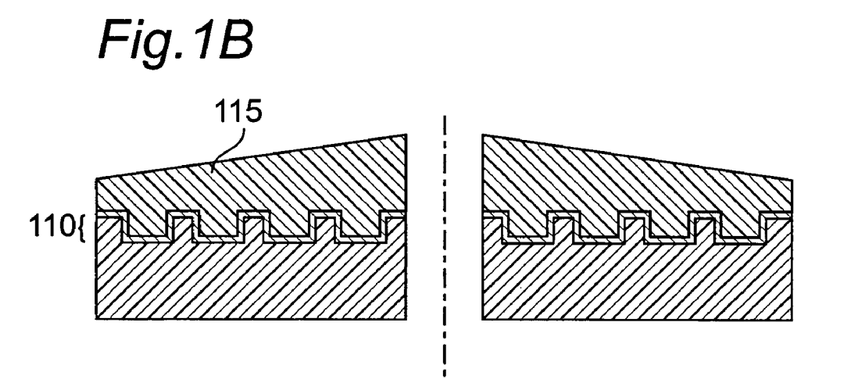
Figure 1C:
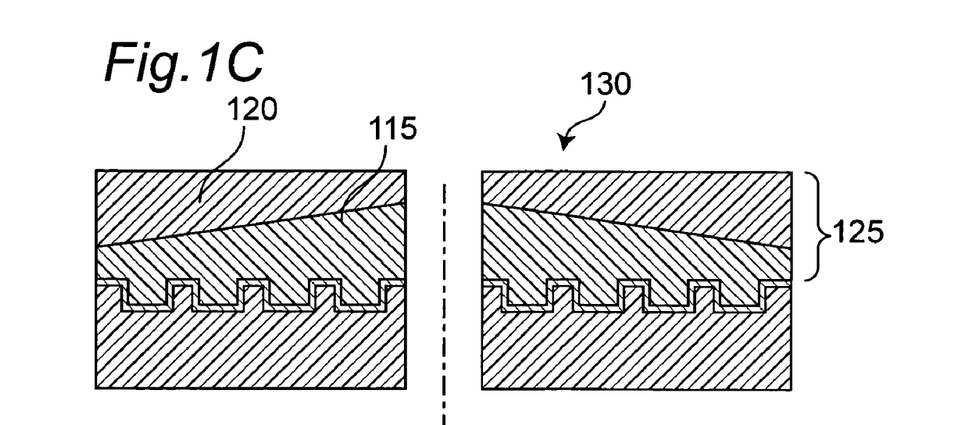

FIGS. 1A to 1C show an embodiment of a manufacturing method of the optical information recording medium according to the invention. Referring to FIG. 1A, first, a signal substrate 100 is prepared with a thickness of 1.1 mm. On a principal surface A of the signal substrate 100, concavities and convexities 105 are formed according to signals. The signal substrate 100 is made of plastic such as polycarbonate and acrylics and generally formed by an injection molding process. Alternatively, the 2P method may be performed to transfer the concavities and convexities 105 according to signals to the supporting substrate. A recording film 106 is formed on the concavity and convexity 105 according to signals to constitute a signal recording layer 110. The recording film 106 is a multilayer or monolayer film including at least one of a metal reflection film, a semiconductor film (for example, a phase change film such as a GeSbTe film), a dielectric film, and a pigment film. The method of forming the recording film 106 depends on the material but is generally a sputtering method. The pigment film may be formed by spin coating. On the signal substrate 100, a signal layer (described below) may be provided which includes the concavities and convexities 105 according to signals and a plurality of recording films formed in the thickness direction.

Figure 2A:
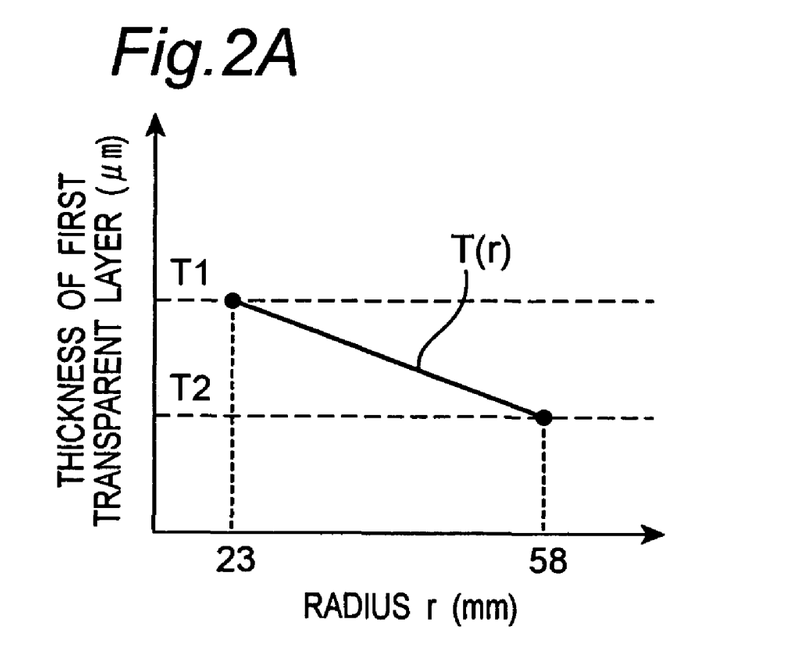
FIGS. 2A and 2B are diagrams each showing an example of the controlled distribution of thickness of each of the first and second transparent layers.

Referring to FIG. 1B, a first transparent layer 115 is then formed on the signal recording layer 110. In this process, the first transparent layer 115 is formed so as to have the distribution of thickness T(r) (wherein r is a radius in the optical information recording medium) in the radius direction as shown in FIG. 2A. The thickness of the first transparent layer 115 is controlled so as to decrease in the radius direction from the inner radius to the outer radius (thickness T1 at the inner radius is larger than thickness T2 at the outer radius (that is, T1>T2)). For example, the material for the first transparent layer 115 includes a radiation cure type resin such as an ultraviolet cure type resin. In this structure, the thickness ratio T2/T1 is preferably from 0.90 to 0.99. In such a range of the ratio T2/T1, the thickness can be controlled with respect to both T1 and T2.

Figure 2B:
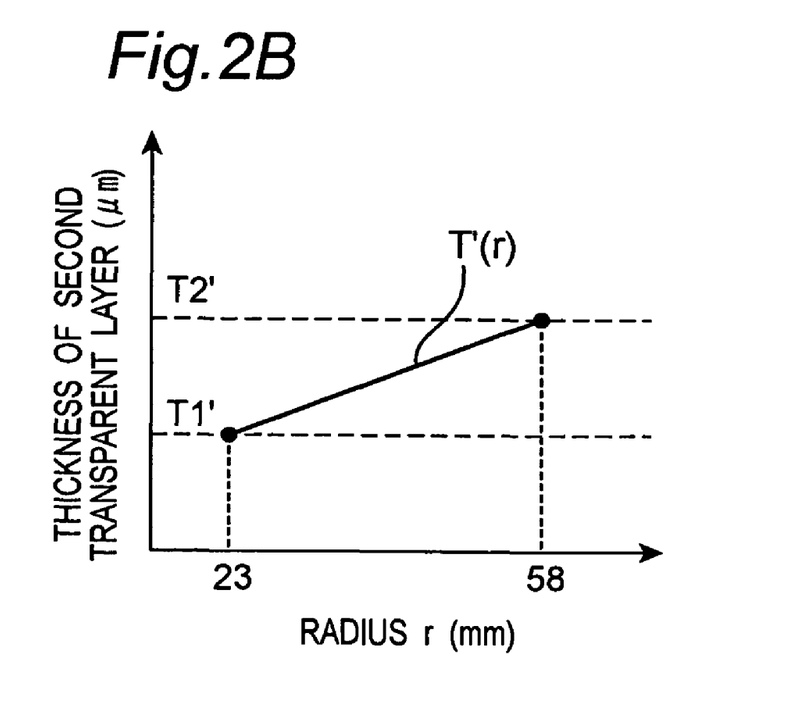

Referring to FIG. 1C, a second transparent layer 120, which is harder than the first transparent layer 115, is then further formed on the layer 115 to complete an optical information recording medium 130. The second transparent layer 120 is provided to protect the first transparent layer 115 and made of a material having such hardness that it is capable of resisting a collision with the lens. The second transparent layer 120 is formed so as to have the distribution of the thickness T'(r) in the radius direction as shown in FIG. 2B. Therefore, the thickness is controlled so as to increase in the direction from the inner radius to the outer radius. As shown in FIG. 2B, thickness T'1 at the inner radius is smaller than thickness T'2 at the outer radius (that is, T'1<T'2). In this structure, the thickness ratio T'1/T'2 is preferably from 0.5 to 0.7. In such a range of the ratio T'1/T'2, the thickness can be controlled with respect to both T'1 and T'2. In addition, it is important that the conditions for forming the first and second transparent layers 115 and 120 should be selected so that the total thickness T(r)+T'(r) of the transparent cover layer is as close to 100 μm as possible at any radius. Thus, a good selection of each forming condition will provide a uniform 100 μm thick transparent cover layer 125 which comprises the first transparent layer 115 and the second transparent layer 120.

The method of forming the first and second transparent layers 115 and 120 by spin coating is more specifically described below.

An ultraviolet cure type resin with a viscosity of 2000 mPa·s is used as a material for the first transparent layer. An ultraviolet curable hard coat agent with a viscosity of 30 mPa·s is used as a material for the second transparent layer, which serves as a protective layer. The material for the first transparent layer, the ultraviolet cure type resin, provides a pencil hardness of H after being cured. On the other hand, the material for the second transparent layer, the hard coat agent, provides a pencil hardness of from 2 H to 3 H after being cured. Thus, the transparent cover layer can be prevented from being damaged even if a lens collides with the second transparent layer at the time of recording or reproduction.

Figure 3A:
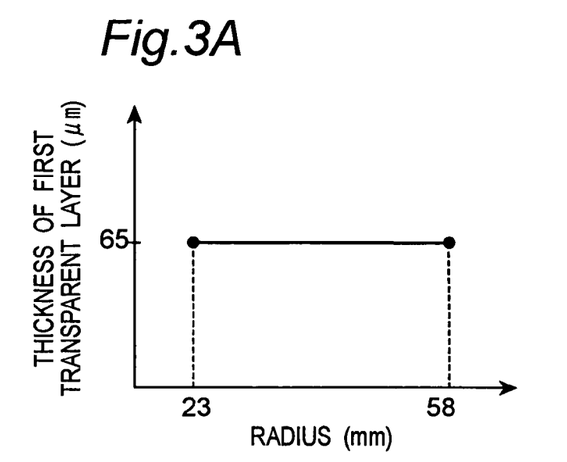
FIGS. 3A to 3C are diagrams showing changes in thickness distribution in each process of forming the first transparent layer and distribution of thickness of the second transparent layer.
Figure 3B:
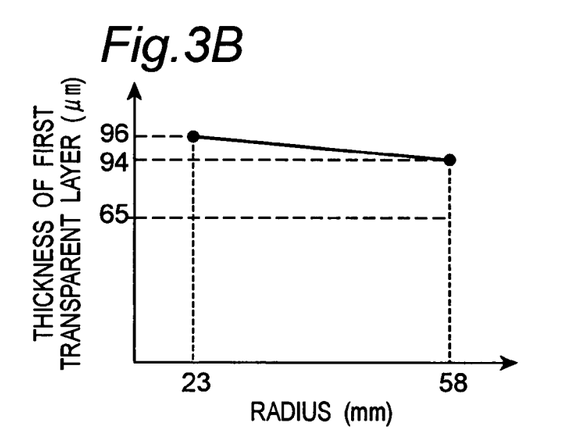

In this embodiment, the first transparent layer is formed by stacking two transparent layers. First, 3 g of the ultraviolet cure type resin is dropped or supplied on the substrate in the shape of doughnut with the 15 mm radius position of the signal substrate having the signal recording layer, and the substrate is spun at 1000 rpm for 35 seconds. After the spinning operation, the first transparent layer is substantially uniformly formed with a thickness of 65 μm as shown in FIG. 3A. Then, 0.3 g of the ultraviolet cure type resin is similarly dropped or supplied onto the 15 mm radius position, and the substrate is spun at 500 rpm. In this spinning step, a transparent layer having a thickness gradient in the radius direction is formed on the previously formed transparent layer with a uniform thickness of 65 μm, so that the first transparent layer obtained has such distribution of thickness as shown in FIG. 3B. In general, highly viscous materials can easily be controlled with respect to the thickness distribution in the radius direction. The first transparent layer is then cured by ultraviolet radiation. This step is performed for the purpose of preventing the thickness distribution, as shown in FIG. 3B, from collapsing, otherwise the ultraviolet cure type resin material would be extended by spinning in the next step of forming the second transparent layer by spin coating so that the distribution could collapse. In the above process, the first transparent layer is formed of two transparent layers, but more layers may be stacked to form the transparent layer.

Figure 3C:
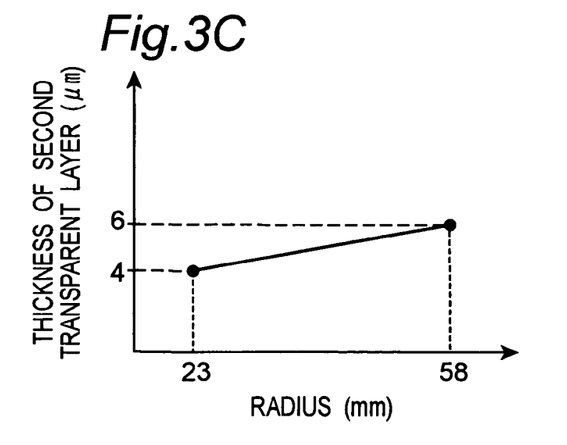
Figure 4:
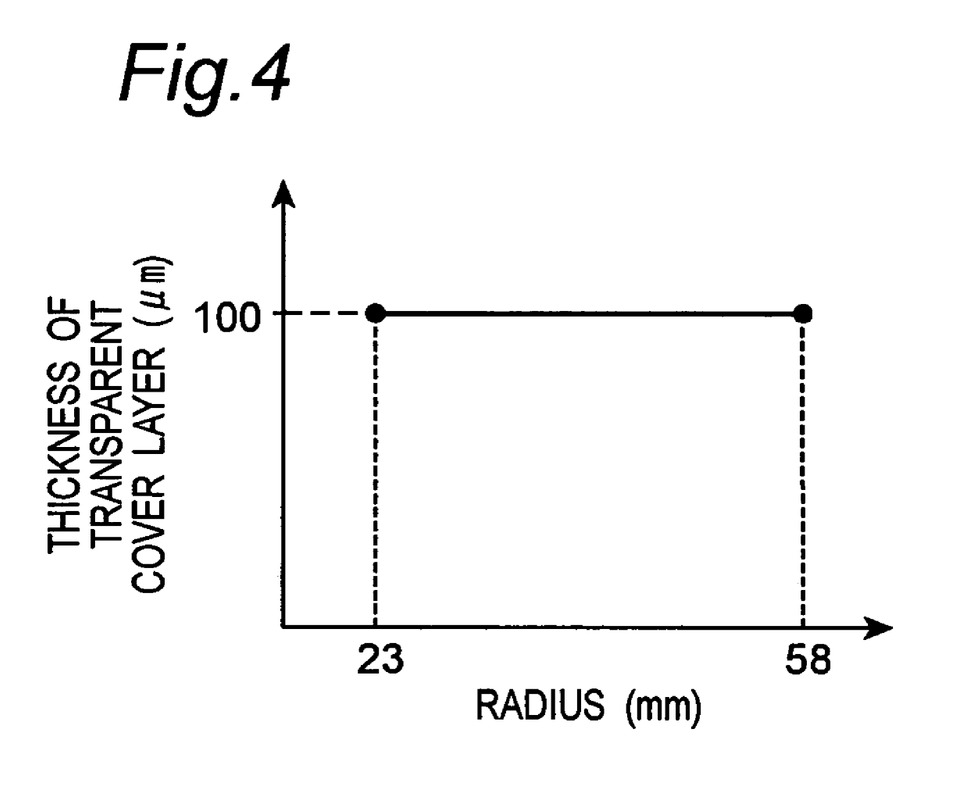
FIG. 4 is a diagram showing an example of the distribution of thickness of the transparent cover layer formed according to the manufacturing method of optical information recording medium according to the invention.

The hard coat agent is then supplied onto the 15 mm radius position in the shape of a doughnut, is subjected to spinning at 4000 rpm for 5 seconds, and cured by ultraviolet radiation to form the second transparent layer 120. For the second transparent layer material, the hard coat agent with a higher hardness than that of the first transparent layer is used. Therefore, the surface of the transparent cover layer can be free from damage even if the lens collides at the time of a recording or reproduction operation. Spinning of the hard coat agent provides a thickness distribution in which the thickness of the second transparent layer increases in the direction from the inner radius to the outer radius as shown in FIG. 3C. Thus, the thickness distributions as shown in FIGS. 3B and 3C are added so that an even, hard, transparent cover layer (whose surface can be free from any damage from lens collision) with a thickness of about 100 μm is formed on the signal substrate, as shown in FIG. 4. In a general optical disc recording and reproducing operation, 30 mλ in spherical aberration generated by the thickness error of the transparent substrate (the transparent cover layer in this embodiment) on the record/reproduction side is an allowable value for stable recording and reproduction. At a wavelength of 405 nm for recording and reproduction, a transparent cover layer thickness of 100±3 μm (dispersion: ±3 μm) can provide a spherical aberration of at most 30 mλ even when a large NA lens (for example, with a NA of 0.85) is used in recording and reproduction. In such a case, recording and reproduction can be performed without any trouble, and signals can be obtained in good quality.

As described above, the transparent layer with a desired thickness can be formed by controlling appropriately the amount or dropping time of the ultraviolet cure type resin dropped on the inner radius of the signal substrate, and the revolution speed of the signal substrate.

The description below is about the control of the thickness in the process of forming the first transparent layer by spin coating.

FIGS. 5A to 5E show changes in thickness distribution in the transparent layer versus revolution time in the case that the first transparent layer is formed by spin coat.

Figure 5A:
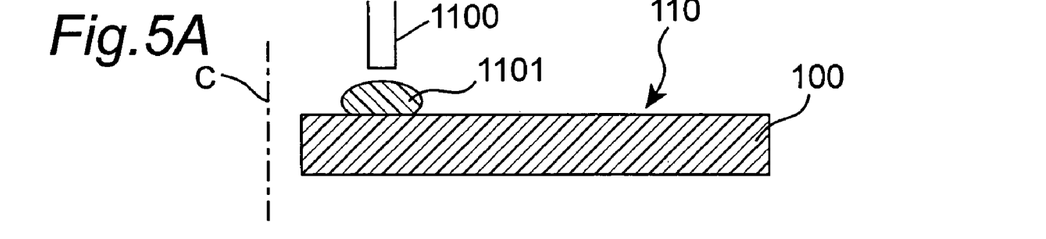
FIGS. 5A to 5E are diagrams showing changes in thickness distribution versus revolution time when the first transparent layer is formed by a spin coating method.

Referring to FIG. 5A, the first transparent layer material, that is, a radiation cure type first resin 1101 is supplied from a nozzle 1100 onto the signal substrate 100. The alternate long and short dashed line C represents the center axis of the signal substrate 100 having a center hole. The radiation cure type first resin 1101 is preferably supplied in the shape of a ring, onto the inner radius of the surface on the signal recording layer 110 side of the signal substrate 100.

Figure 5B:
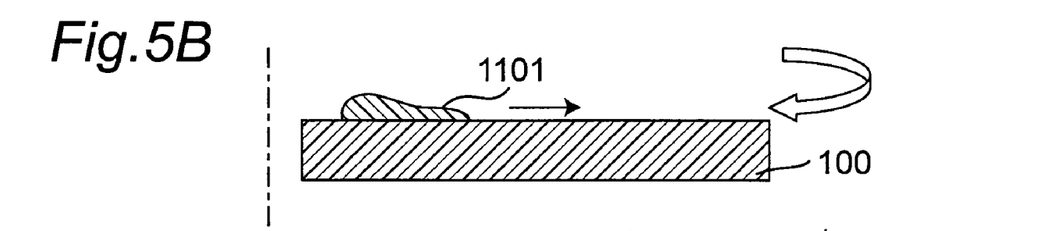

Referring to FIG. 5B, the signal substrate 100 is rotated around the center axis C at a certain revolution speed. The radiation cure type first resin 1101 starts spreading toward the outer radius due to the centrifugal force from the rotated signal substrate 100. As revolution time advances, the radially directional distribution of the thickness of the radiation cure type first resin 1101 changes sequentially as shown in FIGS. 5C, 5D and 5E.

Figure 5C:
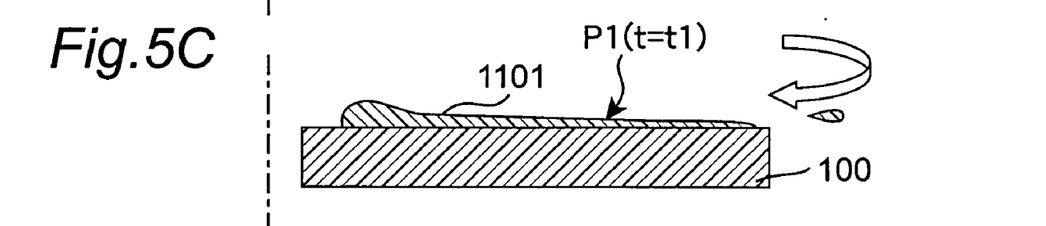

FIG. 5C shows a state after a time of t1 from the rotation start, in which the radiation cure type first resin 1101 reaches the outer radius. The centrifugal force is lower at the inner radius than at the outer radius, and the radiation cure type first resin 1101 is supplied at the inner radius. In the distribution P1 of thickness of the radiation cure type first resin 1101, therefore, the amount of the resin 1101 is larger at the inner radius than at the outer radius, and its thickness tends to increase as it goes toward the inner radius.

Figure 5D:
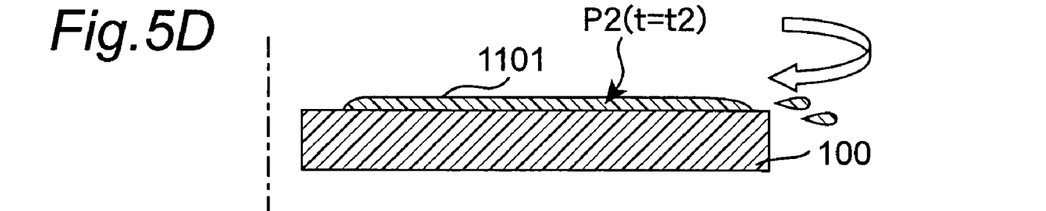

FIG. 5D shows a state after a time of t2 (t1<t2), in which the radiation cure type first resin 1101 further extends from the inner side to the outer side so that the thickness distribution P2 is substantially uniform from the inner to the outer side. Such a uniform distribution of thickness of the radiation cure type first resin 1101 is kept only for a very short time period. Such a state exists for a short time, that is, a short period through which the state as shown in FIG. 5C is changed into the state as shown in FIG. 5E. As the viscosity of the radiation cure type first resin 1101 increases, the state as shown in FIG. 5D is kept longer. The distribution as shown in FIG. 3A is obtained from the state as shown in FIG. 5D.

Figure 5E:
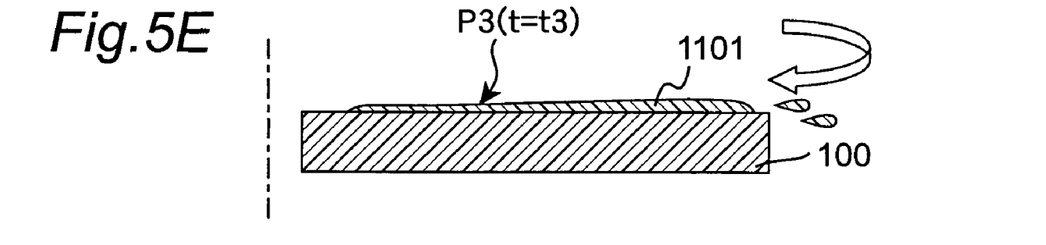

As the time further elapses and reaches a time of t3 (t2<t3), the state becomes as shown in FIG. 5E. This state can be a stationary state in which the radiation cure type first resin 1101, which has initially been at the inner radius, fully extends to the outer radius. In the thickness distribution P3, the thickness tends to gradually increase in the direction from the inner radius to the outer radius.

When the rotation is further continued, the resin is released from the outer end, and therefore, the average of the thickness in each of the thickness distributions P1 (t=t1), P2 (t=t2) and P3 (t=t3) decreases as the rotation time advances.

Thus, a desired thickness distribution P1, P2 or P3 as shown in FIGS. 5C to 5E can be achieved by appropriately controlling the revolution speed and the rotation time depending on the viscosity of the radiation cure type resin in the spin coating operation.

Thin layers can be relatively easily controlled so as to have a uniform thickness and a desired thickness distribution. Therefore, a relatively thick film with a desired thickness and a desired thickness distribution can be formed by applying and stacking a plurality of thin layers. That is, the first transparent layer with a desired thickness and a desired thickness distribution can easily be formed by stacking a plurality of transparent thin layers each with the thickness distribution P1, P2 or P3. For example, under the conditions of the distribution as shown in FIG. 5C with an average thickness of 10 μm and a difference of 2 μm between the inner and outer radius thicknesses, a transparent layer with an average thickness of 60 μm and a difference of 12 μm between the inner and outer radius thicknesses can be formed by repeating the spin coat operation six times. The distributions as shown in FIGS. 5C and 5D may also be combined. Such combination can control the difference between the inner and outer radius thicknesses with a high degree of precision and can provide a variety of thickness distributions in a wider range.

Second Embodiment

Here is a description of a manufacturing method of a recording medium having two signal recording layers formed in the direction of depth of the recording medium.

Figure 6A:
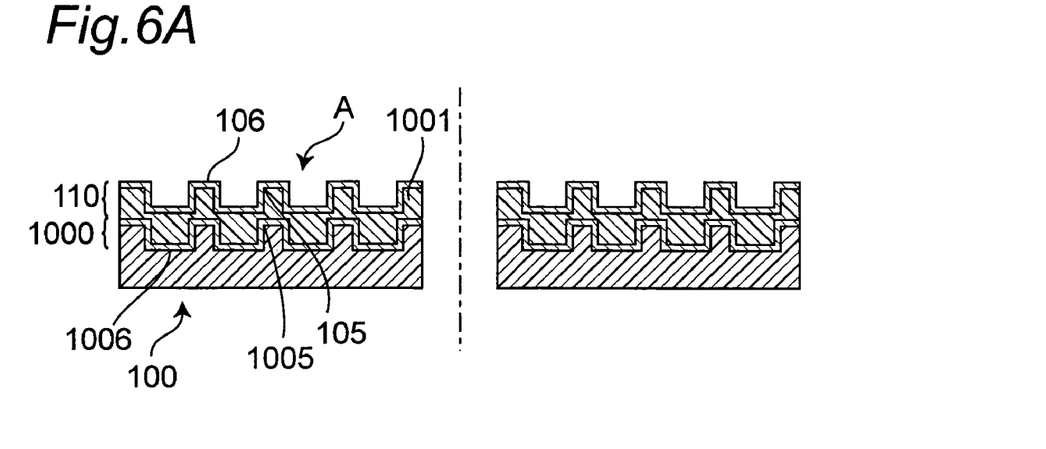
FIGS. 6A to 6C are drawings showing a process of forming the transparent cover layer when two signal recording layers are formed on the signal substrate.

Referring to FIG. 6A, on a signal substrate 100, formed are a first signal recording layer 110 and a second signal recording layer 1000 formed under the first layer 110 via a separation layer 1001. The second signal recording layer 1000 includes concavity and convexity 1005 according to second signals and a second recording film 1006.

Figure 6B:
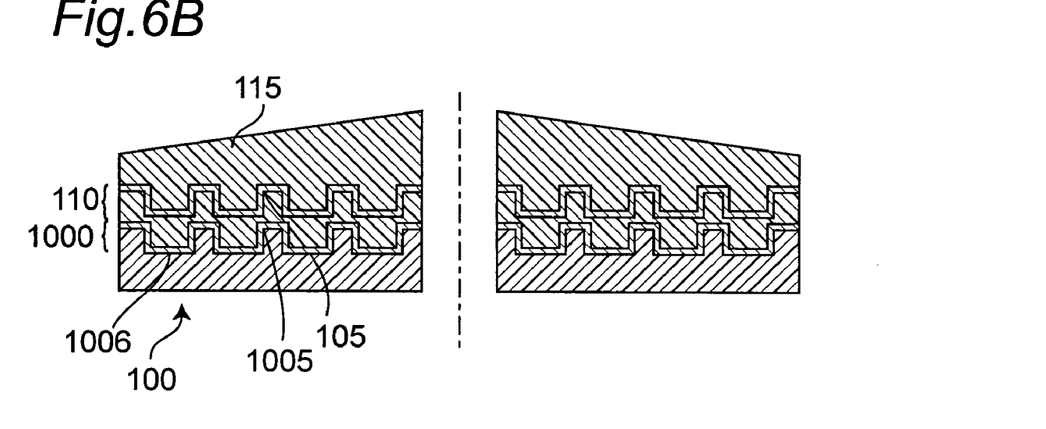
Figure 6C:
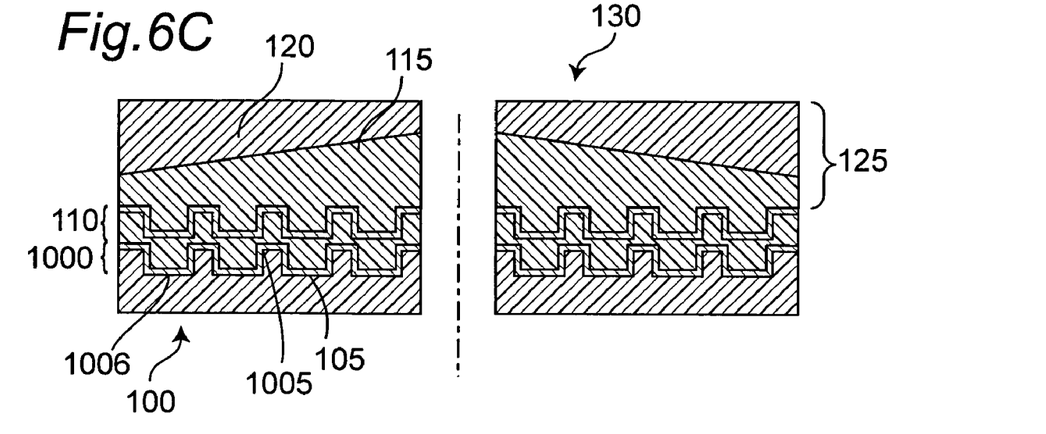

As shown in FIG. 6B, the first transparent layer 115 is formed on the first signal recording layer 110, and as shown in FIG. 6C, the second transparent layer 120 is formed thereon, by the method according to First Embodiment.

The thickness of the separation layer 1001 is determined depending on the numerical aperture of the lens used in recording and reproduction. The numerical aperture is determined depending on the recording densities of concavity and convexity 105 and 1005 according to first and second signals, respectively. In this embodiment, the numerical aperture is set at 0.85. A thickness of the separation layer 1001 between 10 μm and 40 μm is enough for the separation layer. In contrast to the case as shown in FIG. 1, this embodiment has the separation layer 1001 with a thickness of 10 to 40 μm. If the distance from the second signal recording layer 1000 to the surface of the transparent cover layer 125 is set at 100 μm, the thickness of the transparent cover layer 125 is preferably set between 60 μm and 90 μm. When signals are recorded or reproduced to/from the transparent cover layer 115 side, the second signal recording layer 1000 is relatively distant from the surface of the transparent cover layer 125 and therefore can have more degraded signals due to warpage of the optical information recording medium 130 as compared with the signal recording layer 110. For the purpose of suppressing degradation of signals of the second signal recording layer 1000, the thickness of the transparent cover layer 125 should be less than 100 μm in consideration of the thickness of the separation layer 1001. Three or more recording layers may also be provided in a similar manner to the two layers as described above. In such a case, the thickness of the transparent cover layer or the separation layer should be set at another value depending on the number of the signal recording layers. For example, the thicknesses of the transparent cover layer and the separation layer may be so selected that the distance from the surface of the transparent layer to the most distant signal recording layer is set at about 100 μm.

Third Embodiment

In this embodiment, provided is a method of forming the first transparent layer by screen printing. The second transparent layer is formed by the method of the above embodiment.

Figure 7A:
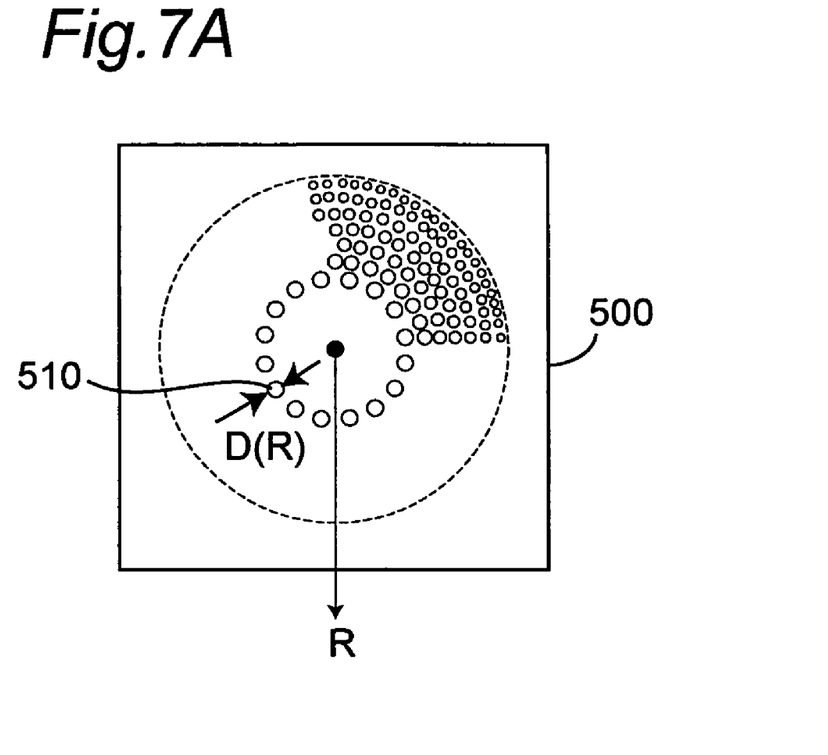
FIGS. 7A and 7B are diagrams showing an example of the process of forming the first transparent layer in the manufacturing method of the optical information recording medium according to the invention.
Figure 7B:
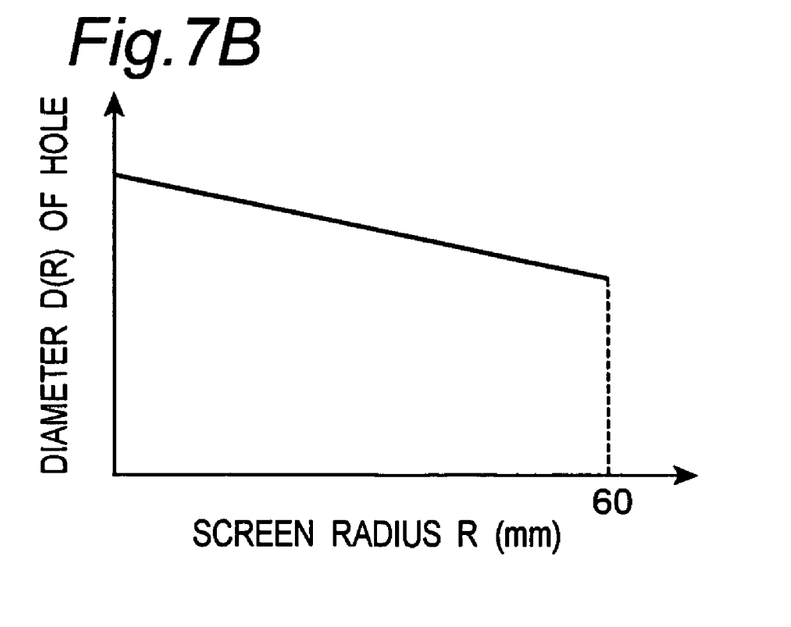

FIG. 7A shows a screen for use in forming the first transparent layer in this embodiment. Referring to the drawing, a screen 500 has a number of holes 510 each having a diameter D(R) depending on the distance (the diameter) R from the center and are concentrically arranged. FIG. 7B shows the relationship between the diameter D(R) of each hole and the diameter at which the hole is provided on the screen 500. It is preferred that the diameter D(R) of the hole decreases as the distance R increases, as shown in the drawing. The screen 500 is placed on the signal substrate 100, and according to the screen printing, the radiation cure type resin is allowed to pass through the screen 500 using a spatula or the like so that the first transparent layer 115 is provided in a similar form to that of the First Embodiment as shown in FIG. 1B. The radiation cure type resin is supplied from the screen 500 to the substrate in a large amount through the hole with a large diameter D(R) and in a small amount through the hole with a small diameter D(R). After the resin is supplied to the signal substrate 100 through the screen 500, the resin is cured by radiation such as ultraviolet radiation to form the cured first transparent layer. Specific diameters D(R) of the holes significantly depend on the viscosity of the radiation cure type resin used. The first transparent layer with the thickness distribution as shown in FIG. 2A or 3B can be formed by selecting an appropriate profile of D(R) according to the viscosity of the radiation cure type resin used. If the second transparent layer with a higher hardness (for example, using the hard coat agent) is formed on the first transparent layer in the method of the First Embodiment, it is possible to form the transparent cover layer which is uniform and tough enough to withstand a collision with a lens.

Fourth Embodiment

In this embodiment, provided is a manufacturing method of an optical information recording medium in which a warpage control layer is further formed on a principal surface on the opposite side of the principal surface formed with the transparent cover layer on the signal substrate.

Figure 8A:
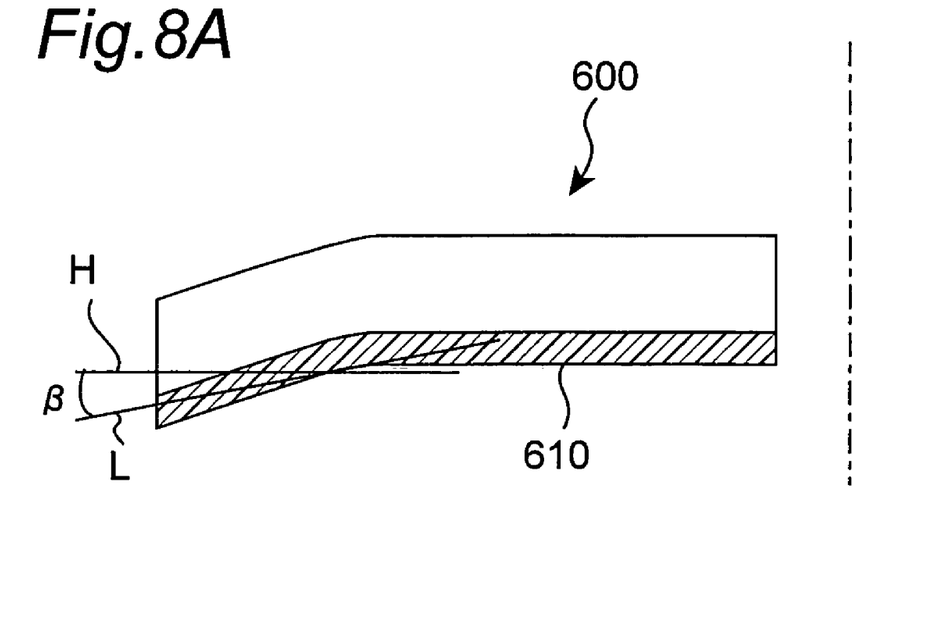
FIGS. 8A and 8B are schematic drawings showing changes in warpage of the optical information recording medium in the manufacturing process according to the invention.
Figure 8B:
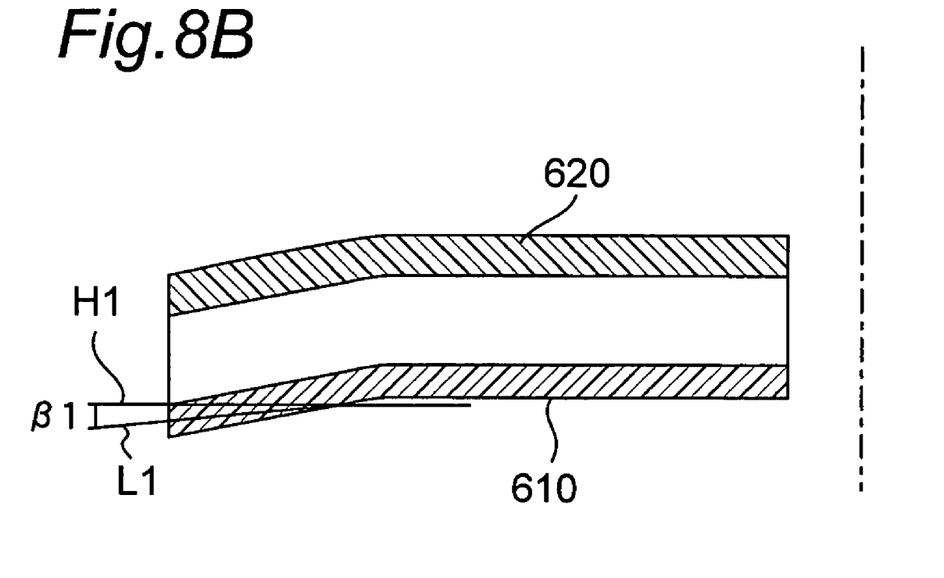

The optical information recording medium to/from which signals are recorded and reproduced with a focused beam through the transparent cover layer having a thickness of about 0.1 mm has an asymmetrical structure in which the 0.1 mm thick transparent cover layer is provided only on one side of the 1.1 mm thick signal substrate. Thus, such a recording medium tends to warp. Particularly when the transparent cover layer is made from the radiation cure type resin, the optical information recording medium can warp due to curing and shrink of the radiation cure type resin toward the side where the transparent cover layer 610 is provided, as shown in FIG. 8A. In this embodiment, therefore, a warpage control layer 620 is formed on a principal surface on the other side of a transparent layer 610, as shown in FIG. 8B, in order to reduce warpage.

Referring to FIG. 8A, a tangent line L to the transparent cover layer 610 of the optical information recording medium 600 makes an angle of β with the horizontal line H. Such an angle is defined as warpage (wherein the warpage direction as shown in FIG. 8A is defined as a positive direction). As shown in FIG. 8B, the warpage control layer 620 formed can reduce warpage to β1 (β1<β). For example, warpage β1 of 0.35 degrees or less can provide good recording and reproducing characteristics even when the recording/reproducing apparatus has no warpage control function.

The material for the warpage control layer 620 is selected so as to have a cure shrinkage percentage that is higher than that of the radiation cure type resin used as the material for the transparent cover layer 610. For example, such a material may be a radiation cure type resin such as an ultraviolet cure type resin or a thermosetting resin. In this case, the thickness of the warpage control layer 620 should be smaller than that of the transparent cover layer 610. The material with a higher cure shrinkage percentage can provide the same cure shrinkage quantity as that for the transparent cover layer 610 in a smaller amount even if the warpage control layer is thin, so that a relatively thin warpage control layer can be formed.

Figure 9:
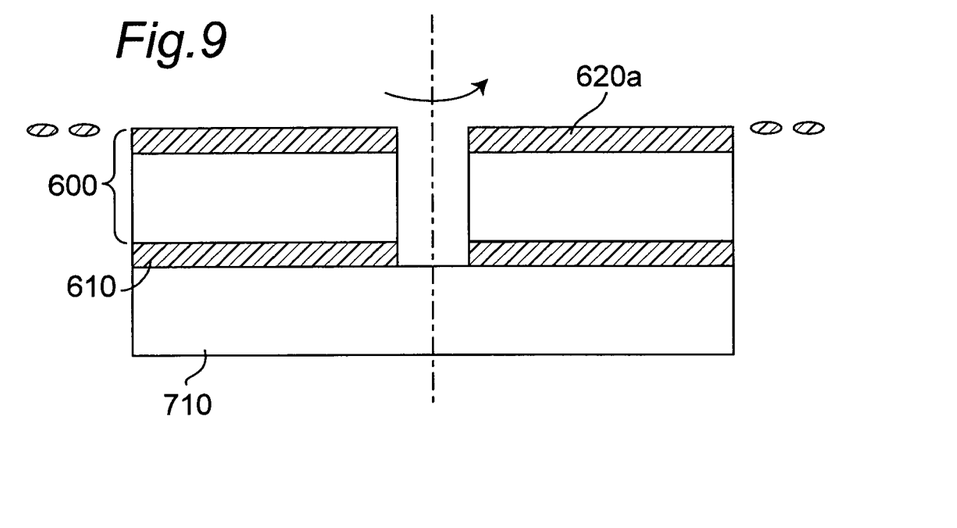
FIG. 9 is a schematic drawing showing a process of forming the warpage control layer.
Figure 10:
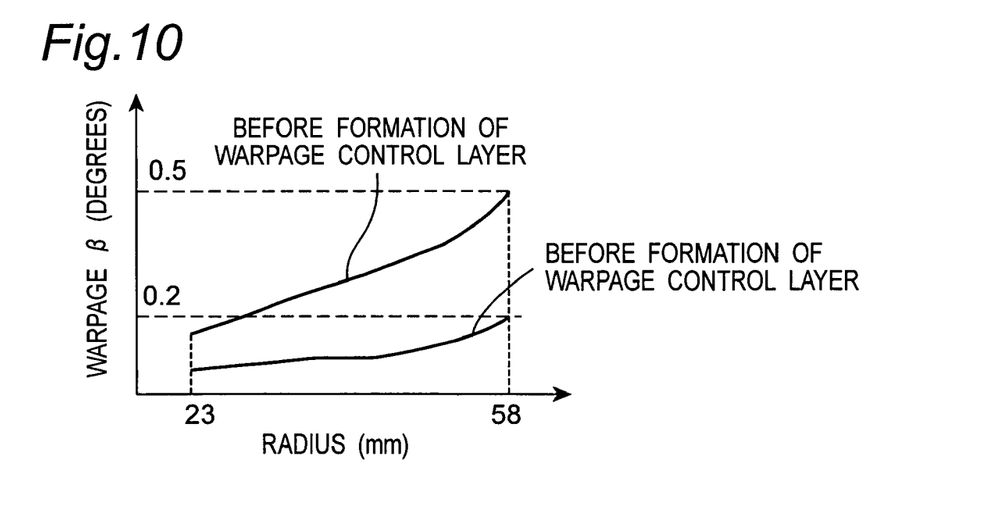
FIG. 10 is a diagram showing a reduction in warpage when the warpage control layer is formed.

FIG. 9 shows a method of forming the warpage control layer 620 using the ultraviolet cure type resin as a material. The optical information recording medium 600 is fixed onto a table 710 via the transparent cover layer 610. The transparent cover layer 610 is made from an ultraviolet cure type resin with a cure shrinkage percentage of 3%. The material for the warpage control layer 620 is an ultraviolet cure type resin 620a with a cure shrinkage percentage of 7% and a viscosity of 30 mPa·s. The ultraviolet cure type resin 620a is supplied onto the opposite surface to the transparent cover layer 610 and extended by spinning the table 710 at 5000 rpm for 30 seconds. The ultraviolet cure type resin 620a is uniformly applied over the surface on the opposite side of the transparent cover layer and then is cured by ultraviolet radiation to form the warpage control layer 620. At this time, the warpage control layer has a thickness of about 1 μm. FIG. 10 shows a change in warpage when the warpage control layer is formed.

Warpage is 0.5 degrees at the 58 mm radius position before the warpage control layer is formed, while it is reduced to 0.2 degrees which is not more than 0.35 degrees, after the warpage control layer is formed.

In the above process, the transparent cover layer differs from the warpage control layer in material. Alternatively, the same material may be used for both layers. In such a case, the same cure shrinkage percentage is provided for both layers, and therefore, the thickness of the warpage control layer is so determined as to provide smaller warpage depending on the degree of warpage after the transparent cover layer is formed. For the purpose of suppressing a change in warpage by accelerated test, it is preferred that the same material is used to form both the transparent cover layer and the warpage control layer and that both layers are formed with substantially the same thickness, namely about 0.1 mm. The warpage control layer is not severely required to be uniform up to some extent. The warpage control layer may be formed by stacking a plurality of thin layers in a similar manner to the First Embodiment.

Fifth Embodiment

In the above embodiment, the warpage control layer is formed in order to reduce warpage of the optical information recording medium. In addition, the warpage control layer may be used to display contents of the recorded information and the like on the optical information recording medium.

Figure 11A:
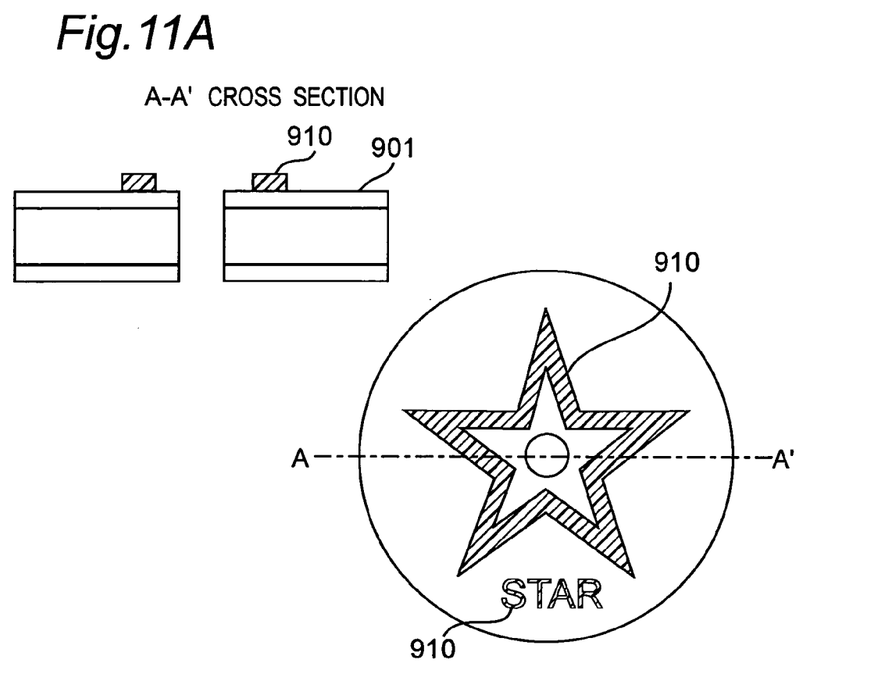
FIGS. 11A and 11B are drawings showing examples of the pattern and the letter marked on the warpage control layer.
Figure 11B:
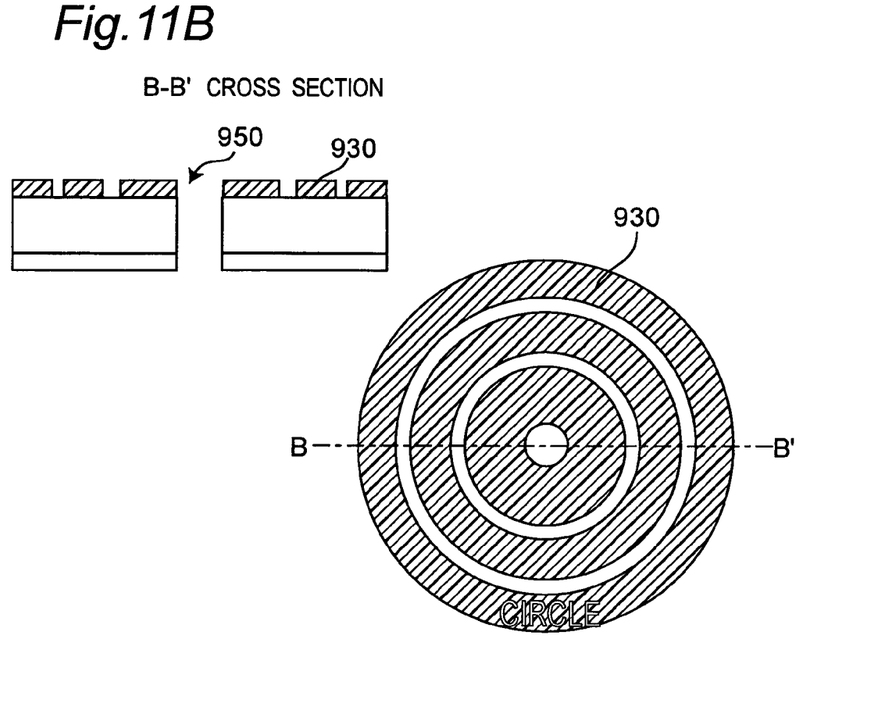

For example, as shown in FIG. 11A, certain patterns or letters may be printed with ink 910 on the surface of a warpage control layer 901. Alternatively, as shown in FIG. 11B, a warpage control layer 930 is distributed over part or the whole of the surface of an optical information recording medium 950 in such a manner that certain patterns or letters can visually be seen. In the print with ink 910 as shown in FIG. 11A, the thickness of ink 910 should be as thin as possible for the purpose of suppressing warpage caused by ink printing. Alternatively, the thickness of the warpage control layer 901 should be adjusted in expectation of warpage quantity provided by ink printing. In the case as shown in FIG. 11B, the warpage control layer is distributed along the patterns or the formation of the letters, so that warpage can locally be generated in the optical information recording medium. For the purpose of preventing such a disadvantage, the area of the warpage control layer may preferably be as large as possible. Although in FIG. 11B, the patterns and letters are formed with the inside parts where the warpage control layer is excluded and the patterns and letters each have a relatively small area, such inside parts may be formed of another warpage control layer with different color. The warpage control layers may be formed by printing.

According to this method, warpage of the optical information recording medium is controlled while information such as recorded contents and makers is represented, and therefore, the manufacturing process can be simplified. For the purpose of improving productivity, screen printing or offset printing may be used to form the warpage control layer with such patterns and letters as shown in FIGS. 11A and 11B.

According to a manufacturing method of an optical information recording medium of the present invention, manufactured is a recording medium including a signal recording layer and a transparent cover layer which has a total thickness of about 0.1 mm and includes a first transparent layer formed on the signal recording layer and a second transparent layer, which is formed on the first transparent layer and is harder than the first transparent layer and through which signals are recorded and reproduced with a focused beam. The transparent cover layer has a hard surface which can be prevented from being damaged due to a collision with a lens. In addition, the thickness distribution in each of the first and second transparent layers is controlled so that the transparent cover layer can be kept uniform in total thickness.

Warpage of the optical information recording medium can be reduced by forming the warpage control layer on the principal surface on the other side of the principal surface where the transparent cover layer is formed.

Although the present invention has been described in connection with specific embodiments, many other modifications, variations and applications are apparent to those skilled in the art. Therefore, the scope of the invention is not limited by the specific disclosure as provided herein but should be limited only by the appended claims.

The invention claimed is:

1. A method of manufacturing an optical information recording medium to/from which signals can optically be recorded and reproduced, the recording medium comprising a signal substrate, a signal recording layer on one principal surface of the signal substrate, and a transparent cover layer, the transparent cover layer including a first transparent layer formed on the signal recording layer and a second transparent layer that is formed on the first transparent layer and is harder than the first transparent layer, signals being recorded and reproduced to and from the recording medium by a light transmitted to the signal recording layer through the transparent cover layer, the method comprising:

forming the first transparent layer so that at least one part of the first transparent layer has a first distribution of thickness which has a thickness gradient in a radial direction; and forming the second transparent layer so that variations in thickness of the transparent cover layer are within ±3 µm wherein the second transparent layer has a thickness of T'1 at the inner radius and a thickness of T'2 at the outer radius, and the ratio T'1/T'2 is from 0.5 to 0.7.

2. The method according to claim 1, wherein the first transparent layer is made of a radiation cure type first resin having a viscosity of V1 before being cured, the second transparent layer is made of a radiation cure type first resin having a viscosity of V2 before being cured which is lower than the viscosity of V1, the second resin, after being cured by radiation, is harder than the first resin after being cured by radiation, the first transparent layer is formed so as to have such a distribution of thickness that the thickness decreases in the direction from an inner radius to an outer radius of the signal substrate, and then is cured, and the second transparent layer is formed so as to have such a distribution of thickness that the thickness increases in the direction from the inner radius to the outer radius of the signal substrate.

3. The method according to claim 2, wherein the first transparent layer is formed by a spin coating process that includes controlling, depending on a time, the amount of the radiation cure type first resin supplied onto the inner part of a principal surface on the signal recording layer side of the signal substrate, the period of the supplying, and the revolution speed of the signal substrate.

4. The method according to claim 2, wherein the first transparent layer is formed by a spin coating process that includes supplying the radiation cure type first resin onto the inner part of a principal surface on the signal recording layer side of the signal substrate, spinning the signal substrate at a first revolution speed to apply the radiation cure type first resin over the whole of the principal surface, then supplying again the radiation cure type first resin onto the inner part of the principal surface, and spinning the signal substrate at a second revolution speed smaller than the first revolution speed until the whole of the first transparent layer has the first distribution of thickness.

5. The method according to claim 2, wherein the first transparent layer is formed by a screen printing process that includes providing a screen having a plurality of holes, and each hole is substantially concentrically distributed in the screen and has a diameter gradually decreasing in the direction from the inner radius to the outer radius.

6. The method according to claim 1, wherein the first transparent layer has a thickness of T1 at the inner radius and a thickness of T2 at the outer radius, and the ratio T2/T1 is from 0.90 to 0.99.

7. The method according to claim 1, further comprising forming a warpage control layer on a principal surface of the signal substrate so that the warpage control layer is disposed on an opposite side of the optical information recording medium relative to the transparent cover layer.

8. The method according to claim 7, wherein
the transparent cover layer is made of a radiation cure type resin,
the warpage control layer is made of a shrinkable material, and
the thickness of the warpage control layer and the shrinkage percentage of the material for the warpage control layer are selected so that a warpage angle of the optical information recording medium is at most 0.35 degrees.

9. The method according to claim 8, wherein the material of the warpage control layer has a cure shrinkage percentage higher than that of the radiation cure type resin for the transparent cover layer, and the warpage control layer has a thickness smaller than that of the transparent cover layer.

10. The method according to claim 7, wherein the warpage control layer and the transparent cover layer are made of the same material.

11. The method according to claim 7, wherein the warpage control layer and the transparent cover layer have substantially the same thickness.

12. The method according to claim 7, wherein the warpage control layer is formed by printing.

13. The method according to claim 7, wherein the warpage control layer is formed on the opposite side principal surface so as to have a visible pattern or letter.

14. The method according to claim 7, wherein a visible pattern or letter is printed on a surface of the warpage control layer.

15. A method of manufacturing an optical information recording medium to/from which signals can optically be recorded and reproduced,
the recording medium comprising a signal substrate, a signal recording layer on one principal surface of the signal substrate, and a transparent cover layer, the transparent cover layer including a first transparent layer formed on the signal recording layer and a second transparent layer that is formed on the first transparent layer and is harder than the first transparent layer, signals being recorded and reproduced to and from the recording medium by a light transmitted to the signal recording layer through the transparent cover layer,
the method comprising:
forming at least one part of the first transparent layer by stacking a plurality of transparent layers so that the first transparent layer has a first distribution of thickness which has a thickness gradient in a radial direction over the whole of the first transparent layer; and
forming the second transparent layer so that variations in thickness of the transparent cover layer are within ±3 µm,
wherein the second transparent layer has a thickness of T'1 at the inner radius and a thickness of T'2 at the outer radius, and the ratio T'1/T'2 is from 0.5 to 0.7.

16. The method according to claim 15, wherein
the first transparent layer is made of a radiation cure type first resin having a viscosity of V1 before cured,
the second transparent layer is made of a radiation cure type first resin having a viscosity of V2 before cured which is lower than the viscosity of V1,
the second resin after cured by radiation is harder than the first resin after cured by radiation,
the first transparent layer is formed so as to have such a distribution of thickness that the thickness decreases in the direction from the inner radius to the outer radius of the signal substrate, and then cured, and
the second transparent layer is formed so as to have such a distribution of thickness that the thickness increases in the direction from the inner radius to the outer radius of the signal substrate.

17. The method according to claim 15, wherein the first transparent layer has a thickness of T1 at the inner radius and a thickness of T2 at the outer radius, and the ratio T2/T1 is from 0.90 to 0.99.

18. The method according to claim 15, further comprising forming a warpage control layer on a principal surface of the signal substrate so that the warpage control layer is disposed on an opposite side of the optical information recording medium relative to the transparent cover layer.

19. A method of manufacturing an optical information recording medium to/from which signals can optically be recorded and reproduced,
the recording medium comprising a signal substrate, a signal recording layer on one principal surface of the signal substrate, and a transparent cover layer, the transparent cover layer including a first transparent layer formed on the signal recording layer and a second transparent layer that is formed on the first transparent layer and is harder than the first transparent layer, signals being recorded and reproduced to and from the recording medium by a light transmitted to the signal recording layer through the transparent cover layer,
the method comprising:
forming at least one part of the first transparent layer so that the first transparent layer has a first distribution of thickness which has a thickness gradient in the radial direction;
forming the second transparent layer so that variations in thickness of the transparent cover layer are within ±3 µm,
wherein the second transparent layer is formed with a thickness of T'1 at the inner radius and a thickness of T'2 at the outer radius, and the ratio T'1/T'2 is from 0.5 to 0.7; and
forming a warpage control layer on the principal surface opposite the principal surface which is formed with the transparent cover layer.

* * * * *

UNITED STATES PATENT AND TRADEMARK OFFICE
CERTIFICATE OF CORRECTION

PATENT NO. : 7,820,234 B2
APPLICATION NO. : 10/479505
DATED : October 26, 2010
INVENTOR(S) : Kazuhiro Hayashi et al.

Page 1 of 1

It is certified that error appears in the above-identified patent and that said Letters Patent is hereby corrected as shown below:

ON THE TITLE PAGE

Item (56) References Cited, under FOREIGN PATENT DOCUMENTS, please delete the following duplicates:

"JP    2-203439    8/1990
 JP   10-302309   11/1998
 JP   11-191240    7/1999"

Signed and Sealed this
Seventh Day of February, 2012

David J. Kappos
*Director of the United States Patent and Trademark Office*